United States Patent
Roemelsberger et al.

(10) Patent No.: US 12,095,060 B2
(45) Date of Patent: Sep. 17, 2024

(54) METHOD AND SYSTEM FOR PRODUCING A THERMAL INTERFACE IN A BATTERY FOR A MOTOR VEHICLE

(71) Applicant: Lisa Draexlmaier GmbH, Vilsbiburg (DE)

(72) Inventors: Michael Roemelsberger, Massing (DE); Stefan Seidl, Landshut (DE); Robert Magunia, Geisenhausen (DE); Christoph Riester, Obererding (DE); Michel Unverricht, Landshut (DE)

(73) Assignee: LISA DRAEXLMAIER GMBH, Vilsbiburg (DE)

( * ) Notice: Subject to any disclaimer, the term of this patent is extended or adjusted under 35 U.S.C. 154(b) by 577 days.

(21) Appl. No.: 17/378,244

(22) Filed: Jul. 16, 2021

(65) Prior Publication Data
US 2021/0344061 A1 Nov. 4, 2021

Related U.S. Application Data (63) Continuation of application No. PCT/EP2020/051000, filed on Jan. 16, 2020.

(30) Foreign Application Priority Data

Jan. 21, 2019 (DE) ................... 10 2019 101 403.4

(51) Int. Cl.
*H01M 10/625* (2014.01)
*H01M 10/04* (2006.01)
(Continued)

(52) U.S. Cl.
CPC ..... *H01M 10/625* (2015.04); *H01M 10/0404* (2013.01); *H01M 10/653* (2015.04);
(Continued)

(58) Field of Classification Search
CPC ........... H01M 10/625; H01M 10/0404; H01M 10/653; H01M 10/655; H01M 10/633;
(Continued)

(56) References Cited

U.S. PATENT DOCUMENTS 10,116,018 B2   10/2018   Phlegm et al.

FOREIGN PATENT DOCUMENTS

| CN | 106329022 A | 1/2017 |
|---|---|---|
| DE | 102011076578 | 11/2012 |

(Continued)

OTHER PUBLICATIONS

Office Action regarding Chinese Patent Application No. 202080009411.0, dated Dec. 14, 2022, 8 pages.
(Continued)

*Primary Examiner* — Matthew W Van Oudenaren
(74) *Attorney, Agent, or Firm* — Burris Law, PLLC (57) ABSTRACT

A method for manufacturing a thermal interface in a battery includes providing of at least one battery module and at least one receiving structure, with a receiving region featuring a heat-transmission surface to accommodate a side of the battery module, measuring of the receiving region and/or the side of the battery module. The method further includes determining, based on the measuring, a size and shape of a gap that forms between the heat-transmission surface and the side of the battery module. Additionally, the method includes determining of a dosage specification for a heat-conducting material for filling of the gap, applying of the heat-conducting material onto the heat-transmission surface and/or to the side of the battery module according to the determined dosage specification, and installing the battery module in the intended installation position by compressing of the applied heat-conducting material.

14 Claims, 4 Drawing Sheets

(51) Int. Cl.
    *H01M 10/653*    (2014.01)
    *H01M 10/655*    (2014.01)
    *H01M 50/204*    (2021.01)
    *H01M 50/24*     (2021.01)
    *H01M 50/249*    (2021.01)
(52) U.S. Cl.
    CPC ....... *H01M 10/655* (2015.04); *H01M 50/204* (2021.01); *H01M 50/24* (2021.01); *H01M 50/249* (2021.01); *H01M 2220/20* (2013.01)
(58) Field of Classification Search
    CPC .... H01M 10/651; H01M 10/60; H01M 10/61; H01M 10/613; H01M 10/615; H01M 10/617; H01M 50/204; H01M 50/24; H01M 50/249; H01M 2220/20; H01M 6/5038
    See application file for complete search history.

(56) References Cited

FOREIGN PATENT DOCUMENTS

| | | | |
|---|---|---|---|
| DE | 102012222133 A1 | | 6/2014 |
| DE | 102018005234 | * | 1/2019 |
| JP | 2000108687 A | | 4/2000 |
| JP | 2017076490 | * | 4/2017 |

OTHER PUBLICATIONS

International Search Report for International Application PCT/EP2020/051000, mailed Apr. 16, 2020.

* cited by examiner

METHOD AND SYSTEM FOR PRODUCING A THERMAL INTERFACE IN A BATTERY FOR A MOTOR VEHICLE

CROSS-REFERENCE TO RELATED APPLICATIONS

This application is a continuation of International Application No. PCT/EP2020/051000, filed on Jan. 16, 2020, which claims priority to and the benefit of DE 10 2019 101 403.4, filed on Jan. 21, 2019. The disclosures of the above applications are incorporated herein by reference.

FIELD

The present disclosure relates to a method and a system for manufacturing a thermal interface in a battery for a motor vehicle.

BACKGROUND

The statements in this section merely provide background information related to the present disclosure and may not constitute prior art.

Thermal interface materials or gap fillers, known broadly as heat-conducting materials, are generally used in battery systems of motor vehicles for heat discharge, and for tolerance compensation of any existing gaps. In order to ensure heat transfer under all tolerance situations, the dosing of such heat-conducting materials usually occurs for the maximum possible gap dimension, and thus usually at a relatively high degree of overflow with respect to a nominal- and above all a minimum-tolerance.

Batteries for motor vehicles usually comprise a plurality of battery modules, wherein a plurality of battery cells are often combined. Such battery modules are accommodated by receiving structures, for example, in the form of battery frames or the like. Such receiving structures can include heat-transmission surfaces, for example, in the form of bulkhead plates as an intermediate layer, cooling plates, other types of cooling structures, or broadly heat sinks, via which excess heat is to be discharged from the battery cells and thus from the battery modules to a cooling system of the battery. Due to manufacturing tolerances, in batteries, for example, different shapes and positions of bulkhead plates, battery frames, undersides of battery modules, and different positions of connection points on battery frames and battery modules appear.

Since a certain degree of overfill of heat-conducting material, i.e., in the form of thermal interface material or gap filler, is often taken into account, in some instances very large forces can occur during installation, above all during placement of the battery modules, if they crimp and displace the already applied heat-conducting material (thermal interface material or gap filler). In addition, it can also happen that very long process times must be taken into account, since the compressing of the already applied heat-conducting material is only possible very slowly in order to keep the forces occurring here low and not to damage the structures, in particular the respective battery modules and receiving structures for battery modules. If insufficient filling of heat-conducting material is used, i.e., if the gap to be filled has not been sufficiently filled with the heat-conducting material, there would be the risk of a very poor thermal performance of the associated cooling system. An insufficient dosing of heat-conducting material is thus also disadvantageous.

Furthermore, an overfill of heat-conducting material is associated with a large material consumption and thus high costs. In addition, this also represents a waste of resources, and thus leads to a poor environmental balance. In addition, commonly used heat-conducting materials usually have a density of generally more than 2 g/cm$^3$, and thus have a relatively large weight that the respective motor vehicle must carry over its service life, which correspondingly negatively impacts the energy balance of the motor vehicle.

SUMMARY

This section provides a general summary of the disclosure and is not a comprehensive disclosure of its full scope or all of its features.

The present disclosure provides at least one thermal interface in a battery for a motor vehicle that can be manufactured as efficiently as possible.

Additionally, the present disclosure provides a method as well as by a system for manufacturing a thermal interface in a battery for a motor vehicle having the features of the independent patent claims. Advantageous designs including advantageous and non-trivial further developments of the present disclosure are specified in the dependent claims.

In the method for manufacturing a thermal interface in a battery for a motor vehicle according to the present disclosure, at least one battery module and at least one receiving structure including a receiving region having a heat-transmission surface are provided for receiving one side of the battery module in an intended installation position. The battery module can include, for example, a plurality of battery cells connected to one another, which are disposed in a housing of the battery module. The receiving structure can be, for example, a battery frame or also other types of receiving structures. Receiving structures include the heat-transmission surface mentioned, which can be, for example, a bulkhead plate. In the case of a bulkhead plate it is usually an intermediate layer between battery module and cooling system; the bulkhead plate serves inter alia for transmitting heat from the battery module to the cooling system. The heat-transmission surface can also directly be a cooling plate, another type of cooling structure, or broadly a heat sink. In the intended installation position the heat-transmission surface thus serves for heat transmission from the battery module to a cooling system of the battery.

The battery cooling system can be configured as active or passive, i.e., it can provide active cooling or passive cooling.

In the method, the receiving region and/or the side of the battery module that can be accommodated by the receiving region of the receiving structure is measured by a measuring device. A size and shape of a gap is determined that denotes the intended installation position of the battery module between the heat-transmission surface and the side of the battery module to be accommodated, wherein this determination is carried out by a data-processing device based on the previously performed measurement. Thereafter, a dosage specification for a heat-conducting material, i.e., for a thermal interface material or for a gap filler, is determined for filling the gap based on the size and shape of the gap as determined by the data-processing device. Then, according to the determined dosage specification, the heat-conducting material is applied from a dosing device to the heat-transmission surface and/or the side of the battery module to be accommodated. Then, the battery module is installed by an installation device in the intended installation position by compressing of the applied heat-conducting material, whereafter the compressed heat-conducting material forms the thermal interface between the side of the battery module and the heat-transmission surface.

In the method for manufacturing the mentioned thermal interface, an application concept with respect to the heat-conducting material is conceived such that the process-chain uncertainties or tolerances are precisely detected, processed, and analyzed, with the result that a tolerance-induced overfilling by the heat-conducting material is inhibited. A tolerance-controlled dosing with respect to the heat-conducting material, thus occurs such that the consumption of heat-conducting material serving as gap filler or as thermal interface material is adapted to the actual gap geometry and, thus to the actual quantity required. This can be effected by using the measuring device to measure the receiving region and/or the side of the battery module to be accommodated, wherein based thereon conclusions are drawn as to the size and shape of the gap, which conclusions define the intended installation position of the battery module between the heat-transmission surface and the side of the battery module to be accommodated.

Both the battery module and the receiving structure have manufacturing tolerances, which can have a significant impact in particular in the case of large subassemblies and welded structures. Within the prescribed tolerance ranges, shape deviations in the form of corrugations or protrusions can occur in the battery modules and also in the receiving structure. Furthermore, certain positions of attachment points or attachment locations can vary. All of these deviations must be compensated by the heat-conducting material. In order to avoid the above-mentioned disadvantages by general overfilling or a non-uniform or even insufficient degree of wetting, the heat-conducting material is thus specifically dosed locally in appropriate amounts at corresponding locations.

Using the method, very small layer thicknesses can thereby be obtained with heat-conducting material. As a result, relatively small compression forces occur, without an overfilling of the mentioned gap between the heat-transmission surface of the receiving structure and the side of the battery module that is accommodated by the receiving structure. The layer thicknesses required with respect to the heat-conducting material thus practically depend only on the tolerances themselves with respect to the battery module and the receiving structure, and no longer on additional process-technical influences, such as, for example, the large forces generally occurring during compression of the applied heat-conducting material, as a result of which the receiving structure and/or the battery module can bend at certain locations.

Using the method, it is also possible to specify a degree of wetting with respect to the heat-conducting material in a process-reliable manner, and thus to obtain the best-possible thermal properties with respect to the heat-conducting material. For example, using the method, a constant thermal resistance can be achieved by a corresponding degree of wetting by the heat-conducting material adapted to a local layer thickness. The degree of wetting can describe, for example, a percentage coverage of a defined surface with heat-conducting material.

Based on the measurement of the receiving region and/or the side of the battery module that is to be accommodated by the receiving region, a type of general positional tolerance can be determined. In particular, local and global differences can also be detected. In addition, it is also possible to take into account compensation functions for oversized, connection or support-points, so that depending on the parameters mentioned a necessary dosage volume with respect to the heat-conducting material can be determined.

Using the method, it is thus possible to adapt the dosage amount of the heat-conducting material exactly to the actual size and shape of the gap which occurs in the intended installation position of the battery module between the heat-transmission surface and the side of the battery module to be accommodated. Here not just the total amount of heat-conducting material can be precisely adjusted. In addition, based on the measurement, it is possible to determine the shape and size of the respective gap in a targeted manner locally and precisely adapted to the heat-conducting material to be introduced. The usually relatively expensive heat-conducting material is thus not wasted using the disclosed method. In this manner, a corresponding environmental and resource efficiency is attained.

Using the disclosed method, an overfilling of the heat-conducting material is avoided and a corresponding weight can also be saved in the respective battery. In addition, for the above-mentioned reasons, particularly good thermal properties can be realized at the thermal interface. In addition, particularly small compression forces for compressing the applied heat-conducting material will occur during the installation of the battery module. The installation device used for installing the battery module can be dimensioned correspondingly smaller, which entails a smaller system investment. The structural load in the receiving structure and in the battery module can also be correspondingly reduced. In addition, using the disclosed method it is possible to achieve particularly short process times during placement of the battery module or during compression of the heat-conducting material.

Another form of the present disclosure provides that the measurement detects at least one of the following variables:
 shape of the heat-transmission surface, in particular corrugations and/or protrusions;
 shape of the side of the battery module, in particular corrugations and/or protrusions;
 position of attachment points of the receiving region;
 position of attachment points on the side of the battery module.

Due to the measuring of the shape of the heat-transmission surface and/or of the battery module, it is possible to determine in a particularly exact manner the size and shape of the gap that appears between the heat-transmission surface and the side of the battery module to be accommodated, in the intended installation position of the battery module. In particular, due to the measuring or detecting of corrugations and/or protrusions it is possible to predict very precisely the shape of the subsequent gap. Taking into account the attachment points on the receiving region and/or the side of the battery module to be accommodated, also provides valuable information in order to define a high-precision dosing specification for the heat-conducting material. In principle, in the course of the method, it is possible to measure all geometric properties of the receiving region and/or of the side of the battery module to be accommodated that have an impact on the size and shape of the gap to be filled with the heat-conducting material. The more precisely the measuring is effected, the more precisely the size and shape of the gap and thus the corresponding dosage specification will be with respect to the heat-conducting material.

A form of the present disclosure provides that the measuring is effected using a 3D camera system, a laser-measuring device, or a measuring probe. However, the measuring device can include optical systems but also tactile systems in order to carry out the measurement. Ideally, the measuring here occurs continuously or at least by a correspondingly finely resolved discrete event cycle. In particular, shape deviations and position deviations within the permissible tolerances are reliably detected in the receiving region and/or the side of the battery module to be accommodated. To increase the measuring accuracy or to validate the measuring results, various optical and/or tactile measuring systems can also be combined with one another.

A further form of the present disclosure provides that when determining the dosing specification, the heat-transmission surface and/or the side of the battery module is divided into individual segments, wherein respective individual volumes with respect to the heat-conducting material are established for the individual segments. In the course of the measuring, measurement data can be determined based on which a general positional tolerance can be determined with respect to the receiving region of the receiving structure and/or the side of the battery module to be accommodated. Local and global differences can also be detected here. In addition, it is also possible to take into account compensation functions for certain support points or abutment points, and based thereon to determine the required dosage volume with respect to the heat-conducting material. Since with the determining of the dosage specification, the heat-transmission surface and/or the side of the battery module to be accommodated is divided into individual segments, it is possible to associate respective individual volumes of the heat-conducting material to be applied, with the individual segments in a particularly effective manner. In this way a particularly simple-to-implement dosage specification is obtained for the used dosing device.

According to a form, the present disclosure provides that in determining of the dosage specification, local differences with respect to rigidities of the receiving structure and/or of the battery module are taken into account. Thus, for example, in a central region a certain excess amount of heat-conducting material can be provided in order to compensate for a bending or gap enlargement during compression of the applied heat-conducting material. If the receiving structure is, for example, a battery frame, then it can have different rigidities in certain frame zones. Such different rigidities can have a corresponding impact during compression of the heat-conducting material, so that these properties can also be taken into account in determining of the dosage specification. By taking into account local differences with respect to rigidities of the receiving structure and/or of the battery module, it is thus possible to adapt the dosage specification with respect to the heat-conducting material in a particularly precise manner to the conditions actually present.

According to one form, the present disclosure provides that the heat-conducting material is applied in the form of a plurality of lines, wherein in determining of the dosage specification, respective cross-sections of the lines are specified in a locally adjusted manner depending on the size and shape of the gap to be filled. In other words, a type of line-application pattern is thus chosen as the application shape with respect to the heat-conducting material, wherein the heat-conducting material is applied in the form of a plurality of lines or tracks. This is advantageous in particular in the context of the above-mentioned segment-type dividing of the heat-transmission surface and/or the side of the battery module to be accommodated. This type of line-type application pattern with respect to the heat-conducting material can be used very easily on the discrete elements or segments. Such a line application pattern can be easily distributed and divided into segments on the surfaces to be thermally connected, i.e., the heat-transmission surface of the receiving structure and/or the side of the battery module to be accommodated. Application of the heat-conducting material can be effected in the form of line-shaped tracks of various cross-sectional shapes, for example, in the form of round or also triangular cross-sections. Due to this application shape in the form of a plurality of lines with respect to the heat-conducting material, the dosage specification can be implemented in a particularly simple and precise manner.

According to an additional form, the present disclosure provides that by regulating of a rate of flow and/or dosing speed, the cross-sections of the lines are locally adapted according to the dosage specification during application of the heat-conducting material. A local volume-control during application of the heat-conducting material can be effected, for example, very easily by variation of the thickness, the height, or broadly of the cross-section. This can be effected very simply, for example, by regulating the rate of flow and/or the dosage speed—i.e., the speed of advance of a dosing head of the dosing device. In this way, it is possible in a precise and simple manner to correspondingly implement the determined dosage specification even while applying of the heat-conducting material. Regardless of how or in which form the heat-conducting material is applied, a dosing of or configuration of the material input is effected according to the locally determined volume of the gap.

A further form of the present disclosure provides that in determining of the dosage specification, the number of lines is varied locally depending on the size and shape of the gap to be filled. In general, during application of the heat-conducting material a switchover of the application shape or of the application pattern is thus conceivable, for example, by switching over from six to three lines or tracks with very small required local volumes and vice versa. The application pattern can be adapted depending on the local volume of the gap to be filled. It can be ensured that the gap between the heat-transmission surface of the receiving structure and the side of the battery module to be accommodated is not overfilled. The application shape need not be limited to line-type application shapes. It is also possible, for example, to select a point-shaped application of the heat-conducting material. The application mode of the heat-conducting material can also be varied, for example, by spraying it onto certain regions, inlaying, or applied in another manner. The application mode can in particular also be adapted to the respectively chosen application shape. In addition, for example, the type of subdivision of the heat-transmission surface and/or of the side of the battery module into individual segments can be varied—i.e., a variation of a grid arrangement can be performed. Here the type of subdividing into the segments is effected, for example, in a manner adapted to the respective chosen application shape. In addition, it is also possible to vary the application shape locally. Thus, for example, in certain regions a line-type application shape for the heat-conducting material could be selected, wherein in other regions a point-shaped application shape of the heat-conducting material is chosen and in other regions, for example, another geometry or shape is chosen in turn for the heat-conducting material. Spaces between the respectively chosen shapes of the heat-conducting material can also be varied as required in order to adapt to the application pattern. By adapting the application pattern with respect to the size, arrangement, and/or distances between the heat-conducting material, an optimized degree of filling of heat-conducting material can be achieved—without applying too much or too little thereof. The application shape is to be understood in particular to mean the shape or configuration by which the heat-conducting material is applied, i.e., for example, line-shaped, point-shaped, or the like. The application pattern is then understood to result from the respectively chosen application shape and arrangement of the heat-conducting material on the respective application surface, i.e., the heat-transmission surface and/or the side of the battery module to be accommodated. The application pattern is thus determined by respectively chosen distances between individual regions of the applied heat-conducting material, but also by the respectively chosen application shape (point-shaped, line-shaped, flat, etc.) of the heat-conducting material and how individual large-surface elements of the heat-conducting material are applied.

Another form of the present disclosure provides that a plurality of battery modules and receiving structures are measured, wherein depending on the measurement an association of the battery modules to the receiving structures is effected according to at least one predetermined association criterion, in particular with respect to a smallest-possible dosage amount of the heat-conducting material to fill up the respective gap. In other words, a type of matching process can thus be carried out by two-sided measuring of a plurality of battery modules and a plurality of receiving structures. Thus best-possible pairings can be established between respective battery modules and receiving structures. This can be effected, for example, by taking into consideration that the gap appearing in the intended installation position, between the respective battery module and the respective receiving structure is particularly small, so that a particularly small dosage amount of heat-conducting material is required. It is also conceivable, for example, that the exact shaping of the heat-transmission surface of the receiving structure and of the side of the battery module to be accommodated are taken into account, and the association between the respective battery module and receiving structure is effected such that there is a particularly uniform gap thickness and thus a particularly uniform thickness of heat-conducting material. In principle, the most diverse association criteria can be specified so as to implement the matching or the association of the different battery modules and receiving structures.

According to an additional form, the present disclosure provides that data resulting from the measurement is used to verify whether predetermined tolerances have been met in the receiving structure and/or in the battery module. In general, the data mentioned can thus also be used for comparison, for example, to verify whether the respective components conform with drawing specifications, e.g., with prescribed tolerance regions, so that in this way NOK parts (NOK=not OK), i.e., rejects, can be identified.

According to another form, the present disclosure provides that data resulting from the measurement is used to determine wear of tools and/or of semi-finished products that are used for manufacturing the receiving structure and/or the battery module. Thus, for example, the data resulting from the measurement can thus be precisely statistically evaluated. A knowledge of the data resulting from the measurement makes it possible, based on the changing shape or dimension, or also based on positional tolerances of the receiving structure and of the battery module, to determine the extent of wear on certain tools or semi-finished products used for manufacturing the receiving structure and/or the battery module. Effects on other processes, in particular subsequent processes, can thus also be recognized early.

In one form of the present disclosure, the system for manufacturing a thermal interface in a battery for a motor vehicle comprises a measuring device, a data-processing device, a dosing device, and an installation device that are designed to carry out the method disclosed herein or an advantageous form of the method disclosed herein. Advantageous designs of the method disclosed herein are to be regarded as advantageous designs of the system disclosed herein and vice versa, wherein the system includes in particular means for carrying out the method steps.

A computer program product or computer program including program code is advantageous that can be stored on a machine-readable carrier or storage medium, such as a semiconductor storage, a hard disk storage, or an optical storage and is used for executing, implementing, and/or controlling the steps of the method according to one of the above-described forms, in particular when the program product or program is executed on a computer or a device.

Further advantages, features, and details of the present disclosure are indicated in the following description of an exemplary form, as well as with reference to the drawings. The features and feature combinations mentioned above in the description, as well as the features and feature combinations shown below in the figure description and/or in the figures themselves can be used not only in the respective combination specified, but also in other combinations or individually without departing from the context of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
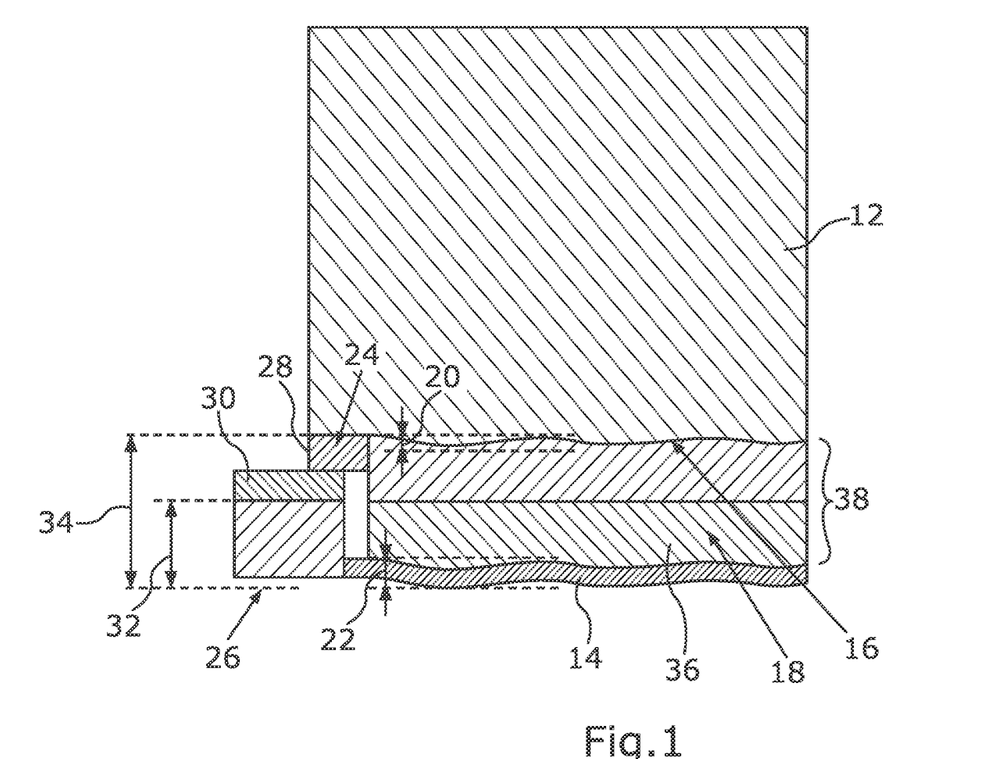
FIG. 1 shows a schematic cross-sectional view of a section of a battery for a motor vehicle, including a battery module disposed on a receiving structure, wherein a heat-conducting material serving as a thermal interface material or as gap filler is disposed between the battery module and the receiving structure, according to the teachings of the present disclosure.

A cross-section of a battery 10 for a motor vehicle is shown in a schematic side view in FIG. 1. The battery 10 can include a plurality of battery modules 12, wherein in the present case only one of the battery modules 12 is schematically depicted. The battery modules 12 can comprise, for example, a plurality of interconnected lithium-ion cells that are disposed in a housing of the battery module 12, which housing is not depicted in more detail. Furthermore, a heat-transmission surface 14 is depicted that belongs to a receiving structure, not indicated here in more detail, for accommodating the battery module 12. The heat-transmission surface 14 can be, for example, a bulkhead wall or also a housing side including a heat sink or cooling plate.

Between an underside 16 of the battery module 12 and the heat-transmission surface 14, in an intended installation position of the battery module 12, a gap, not indicated here in more detail, appears that is filled to the greatest possible extent with a heat-conducting material 18. The heat-conducting material 18 is a thermal interface material or a so-called gap filler. The heat-conducting material 18 serves to provide an optimal-as-possible thermal connection and thus heat transmission from the battery module 12 to the heat-transmission surface 14. For this purpose, it is desired inter alia that the gap mentioned between the underside 16 of the battery module 12 and the heat-transmission surface 14 is filled to the greatest extent possible without air occlusions.

For manufacturing reasons, it is usually not always possible to manufacture the battery modules 12 and in particular also the heat-transmission surface 14 exactly identically. Also for cost reasons alone, certain tolerances are therefore prescribed or allowed, within which dimensional fluctuations, position fluctuations, and shape fluctuations in the battery module 12 and the heat-transmission surface 14 may be allowed. A tolerance range 20 with respect to a shape of the underside 16 of the battery module 12 is schematically depicted here. Likewise, a tolerance range 22 with respect to a shape of the heat-transmission surface 14 is schematically indicated.

Different corrugations or protrusions can thus appear on the underside 16 and on the heat-transmission surface 14, which can occur solely due to reasons of manufacturing technology and can also be tolerated within the tolerance ranges 20, 22. Furthermore, respective connection points 24, 26 are schematically indicated on the underside 16 of the battery module 12 and in the region of the heat-transmission surface 14. Certain tolerance ranges 28, 30 are also permitted with the connection points 24, 26. In particular, certain positional tolerances can appear with respect to the connection points 24, 26.

Due to the various tolerance ranges 20, 22, 28, 30, a certain variance with respect to the size and shape of the mentioned gap will occur; this gap is to be filled by the heat-conducting material 18. A minimum gap height 32 and a maximum gap height 34 that can occur due to an addition of all tolerances is schematically indicated. In accordance with the minimum or maximum gap height 32, 34, a corresponding dosing volume 36 results for the smallest possible gap and a dosing volume 38 for maximum size of the gap.

Figure 2:
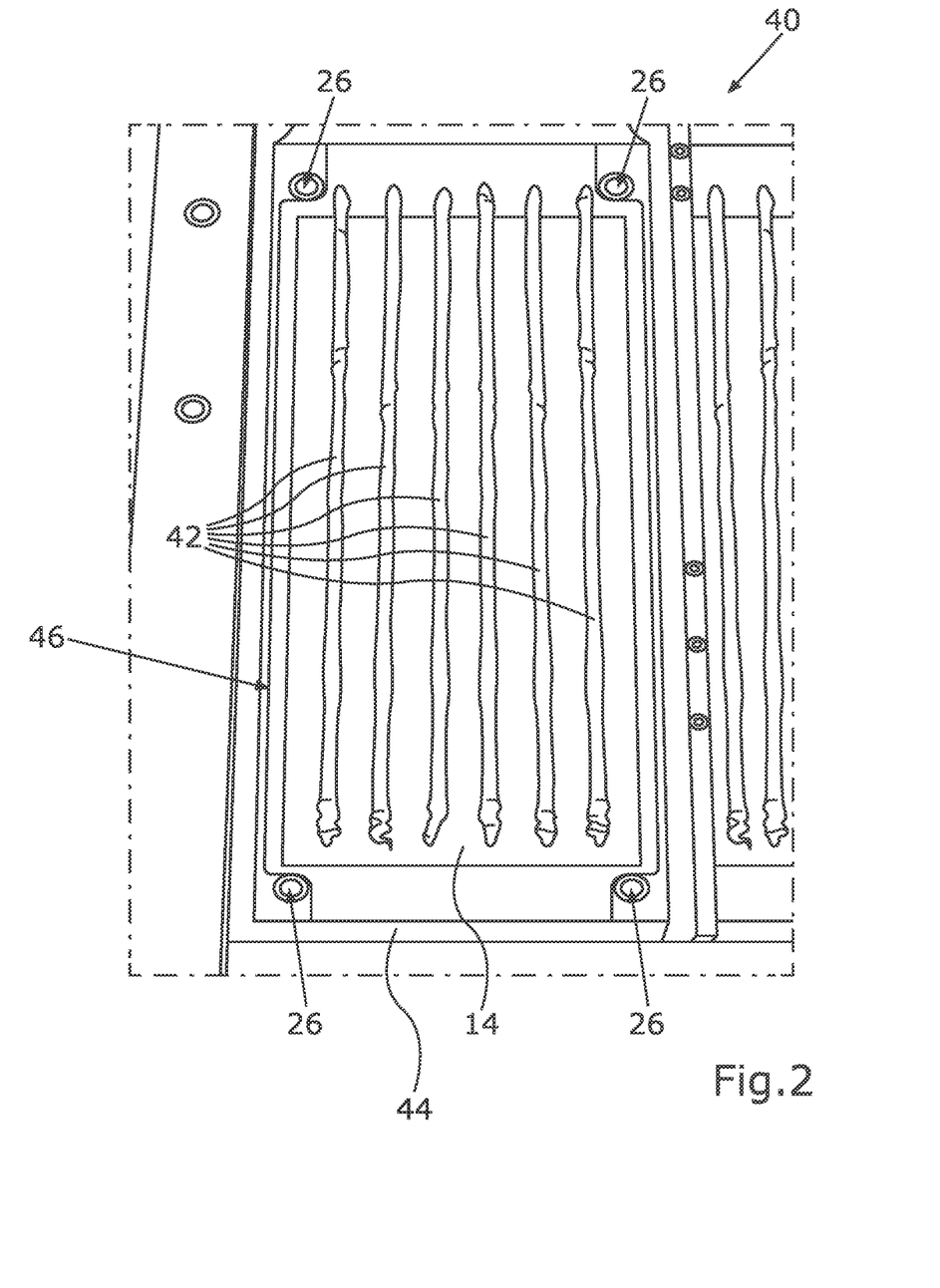
FIG. 2 shows a plan view of the receiving structure, wherein in the region of a heat-transmission surface of the receiving structure the heat-conducting material has already been applied in a line-shaped manner before installing of the battery module, according to the teachings of the present disclosure.

FIG. 2 depicts the already mentioned receiving structure 40 of the battery 10 in a cross-sectional and perspective view. In the present case, the previously mentioned heat-transmission surface 14 can be seen on which the heat-conducting material 18 has been applied in the shape of a plurality of lines 42, and specifically before the battery module 12 has been installed. In the present case, the connection points 26 can be seen in the region of the heat-transmission surface 14, which connection points 26 are configured in the form of screw straps. The receiving structure 40 includes a battery frame 44 and a plurality of receiving regions 46 enclosed thereby in a frame-shaped manner; the receiving regions 46 serve to accommodate one of the battery modules 12 by its respective underside 16. During the installing of the respective battery modules 12, the lines 42 of the heat-conducting material 18 are compressed and subsequently form a respective thermal interface between the underside 16 of the respective battery module 12 and the heat-transmission surface 14 of the respective receiving region 46. Based on the following figures a method for manufacturing the thermal interfaces is explained in more detail.

Figure 3:
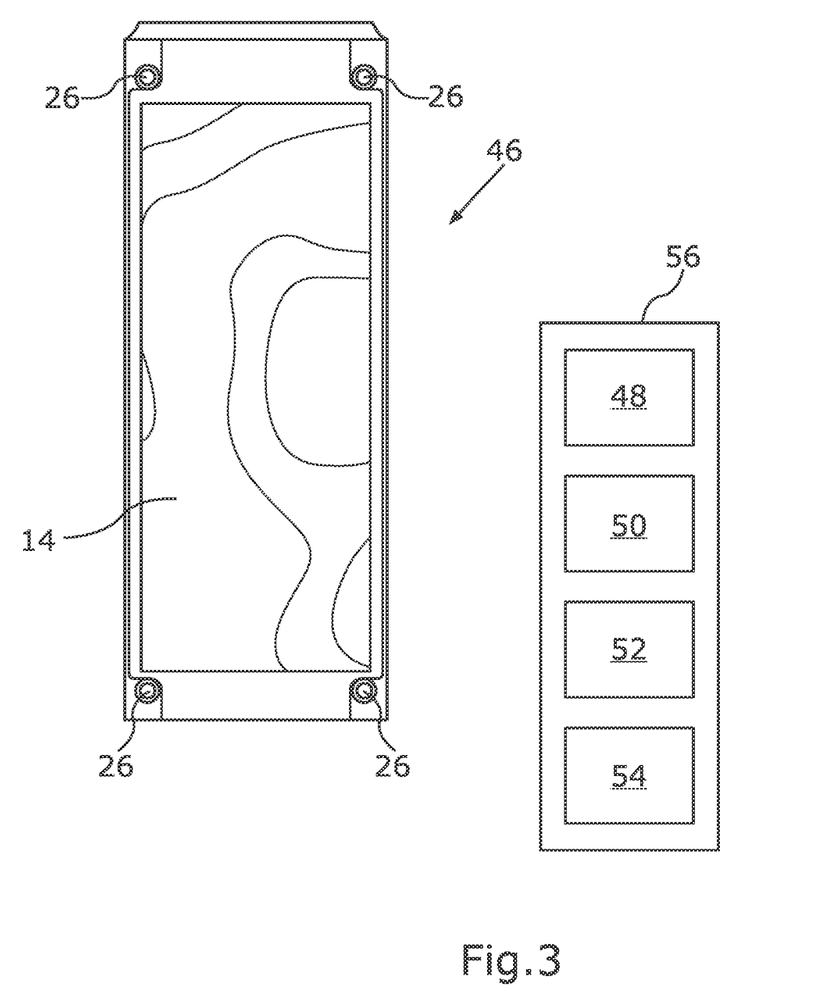
FIG. 3 shows a visualization of data that has been obtained during measurement of the receiving region, according to the teachings of the present disclosure.

FIG. 3 depicts one of the receiving regions 46 of the battery 10 in a plan view, wherein a measurement with respect to the heat-transmission surface 14 of the receiving region 46 herein is depicted. The receiving region 46 is measured using a schematically indicated measuring device 48. For this purpose, the measuring device 48 can include, for example, a 3D camera system, a laser-measuring device, a measuring probe, and/or the like. During measurement of the receiving region 46, in particular a shape of the heat-transmission surface 14 is detected and measured, above all corrugations and/or protrusions. In addition, in one form, a respective position of the connection points 26 serving as attachment points is also measured and thus detected. Likewise, it is also possible to measure and detect the shape of the underside 16 of the respective battery module 12 that is to be inserted into the receiving region 46, above all with respect to corrugations and/or protrusions. Likewise, respective positions of the connection points 24 (see FIG. 1) of the battery module 12 can also be detected and measured.

In the present case, data obtained from measuring of the receiving region 46 has been visualized in the form of the height lines (not indicated in more detail). In this way, the mentioned corrugations and/or protrusions of the heat-transmission surface 14 can be precisely quantified. The same can also be performed additionally or alternatively with respect to the battery module 12.

Depending on the measurement, a size and shape is determined of the respective gap that appears between the heat-transmission surface 14 and the underside 16 of the battery module 12 at the intended installation position of the respective battery module 12. This determination, i.e., evaluation and analysis of the respective measuring results, can be effected using a schematically indicated data-processing device 50. After the size and shape of the respective gap have been determined, based thereon a dosage specification for the heat-conducting material 18 is determined using the data-processing device 50, which dosage specification shall fill the gap between the underside 16 of the battery module 12 and the respective heat-transmission surface 14. The data relevant to the dosage specification are transmitted from the data-processing device 50 to a dosing device 52, which is also only schematically indicated here.

This dosing device 52 then applies the heat-conducting material 18, for example, as depicted in FIG. 2, in the form of individual lines 42. After the heat-conducting material 18 has been applied, the actual installing of the battery module 12 into the receiving region 46 occurs. The installation is performed, using an installation device 54, also only schematically indicated here. The measuring device 48, the data-processing device 50, the dosing device 52, and the installation device 54 together form a system 56 for producing respective thermal interfaces inside the battery 10, which are formed from heat-conducting material 18.

When installing the battery module 12, the underside 16 of the respective battery module 12 extends into contact with the individual lines 42 of the applied or introduced heat-conducting material 18. During the placement process of the battery module 12, the individual lines 42 are compressed, whereafter the compressed heat-conducting material 18 then forms the mentioned thermal interface between the underside 16 of the respective battery module 12 and the heat-transmission surface 14. From the measurement data obtained using the measuring device 48, the data-processing device 50 thus determines a type of general positional tolerance, wherein local and global differences are detected. In one form, determining of the dosage specification is effected using an algorithm that is implemented on the data-processing device 50.

Figure 4:
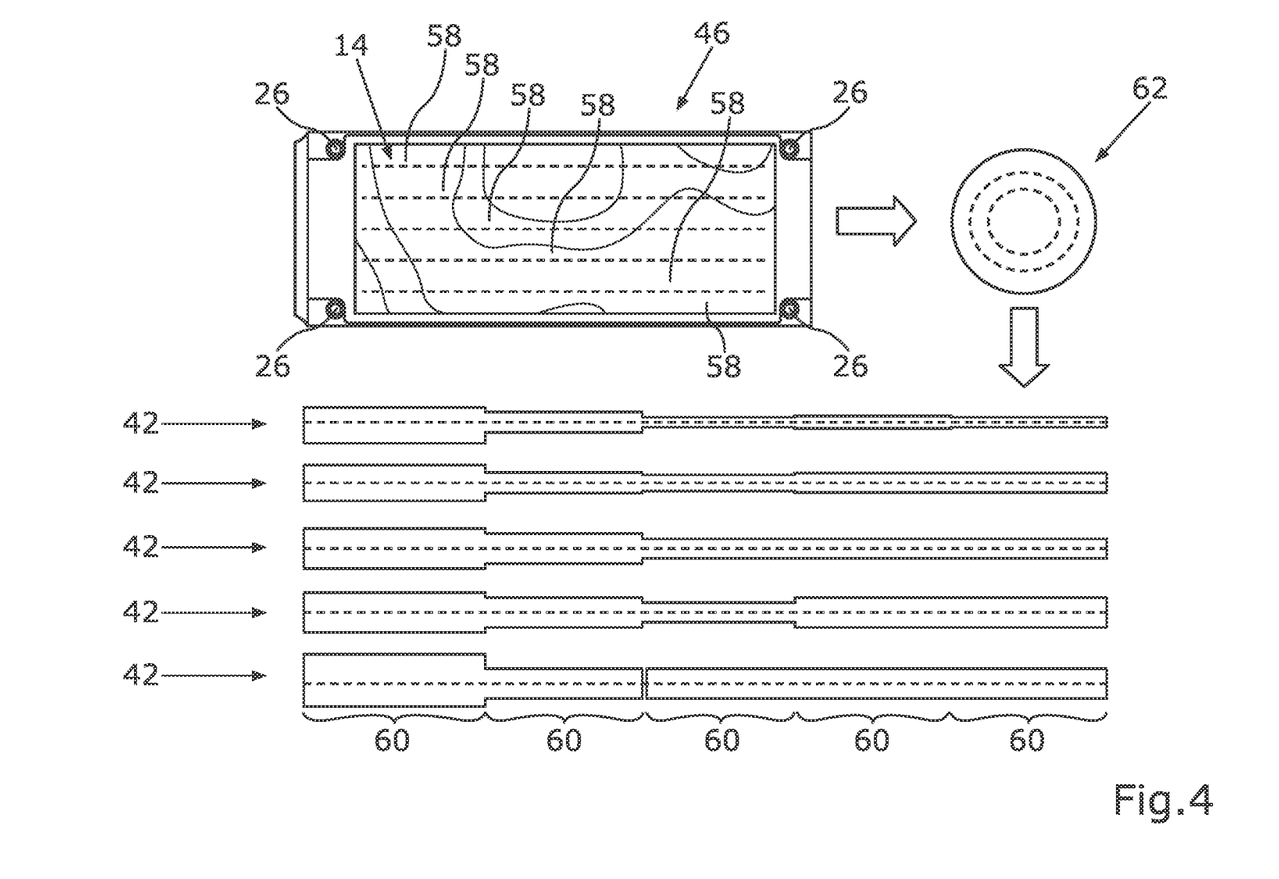
FIG. 4 a schematic depiction of how a dosage specification is determined for the heat-conducting material as well as for application of the heat-conducting material, according to the teachings of the present disclosure.

FIG. 4 schematically depicts one possible procedure for evaluating and implementing the measurement in said dosage specification. When determining the dosage specification, the heat-transmission surface 14 is divided into individual paths 58. The individual paths 58 can then in turn be divided into individual segments 60, which are depicted schematically here below the individual lines 42, according to which the heat-conducting material 18 is applied onto the heat-transmission surface 14. When determining the dosage specification, individual volumes of the heat-conducting material 18 to be applied can be determined for each of the individual segments 60. Thus, locally present circumstances with respect to the shape and size of the gap to be filled can be very easily taken into account. The calculation of the individual volume is then translated or associated with the respectively chosen application shape, in the present case in the form of five lines 42, according to which the dosing device 52 applies the heat-conducting material 18 onto the heat-transmission surface 14.

As schematically depicted in the top-right of FIG. 4, a cross-section 62 of the respective lines 42 can be varied locally in order to provide an optimum fill of the gap present between the underside 16 of the respective battery module 12 and the heat-transmission surface 14 and without overdosing. During determination of the dosage specification, local differences with respect to rigidities of the receiving structure 40 and/or of the battery module 12 can also be taken into account. Thus, it is possible, for example, to plan or provide a certain excess amount of heat-conducting material in a determined range for compensating for deformations or elasticities of the heat-conducting material 18 or of the battery module 12 and/or of the receiving structure 40.

As indicated in FIG. 4, the method is to apply the heat-conducting material 18 in the form of the respective lines 42, using the dosing device 52. When determining the dosage specification, for example, the mentioned cross-sections 62 of the respective lines 42 can be adapted in a manner depending on the size and shape of the local gap to be filled. By regulating a rate of flow and/or dispensing speed in the dosing device 52, when applying the heat-conducting material 18, the cross-sections 62 of the respective lines 42 can be locally adapted according to the corresponding dosage specification. This is schematically indicated here by the line thickness of the individual lines 42, each being depicted differently depending on the particular segment 60.

It is also possible to vary the chosen application pattern, for example, by locally changing the number of lines 42. Thus, it is possible, for example, to provide only three lines 42 in a region wherein relatively little heat-conducting material 18 is required to fill the gap, instead of the five lines 42 shown here. Of course, more than the five lines 42 can also be applied as needed. Here the shape of the cross-sections 62 of the lines 42 is chosen as round, merely by way of example. In principle, any cross-sections 62 or cross-sectional shapes are possible, so that the lines 42 can, for example, also have triangular, rectangular, or any other shape of cross-sections 62. Instead of the line-shaped application pattern shown here, it is also possible to select other application patterns.

After completion of the dosing or applying of the lines 42, within a specific process window the heat-conducting material 18 applied or introduced by the lines 42 is compressed by installing or inserting the respective battery module 12. This process of placing the respective battery module 12 can also be effected subsequently, depending on what specific heat-conducting material is used as gap filler or thermal interface material. After installing and placement of the respective battery module 12, the individual lines 42 have been compressed so that they fill the gap present between the underside 16 of the respective battery module 12 and the heat-transmission surface 14, in a manner at least substantially without air occlusions. A particularly good thermal interface is thus obtained between the respective battery module 12 and the heat-transmission surface 14.

It is also possible that before the determining of the dosing specification, a plurality of the battery modules 12 and a plurality of the receiving structures 40 are measured, wherein depending on the measuring an association of the respective battery modules 12 with the respective receiving structures 40 is effected according to at least one prescribed association criterion. The association criterion can include, for example, that a lowest-possible dosing amount of the heat-conducting material 18 is required. It is also possible that the association criterion comprises that a uniform-as-possible thickness of the heat-conducting material 18 is possible.

By two-sided measuring of the battery modules 12 and of the receiving structure 40, the most suitable battery module 12 can be selected for the best-suited receiving region, in the present case in the form of respective frame compartments of the receiving structure 40. In general, the data resulting from the measurement can also be used for a comparison, for example, in order to verify whether the battery modules 12 and the receiving structure 40 satisfy respective drawing specifications or validity ranges with respect to respective tolerances, so that NOK parts can be identified. It is also possible to evaluate the measurements statistically, so that, for example, trends with respect to wear of forming tools or semi-finished products that are used for manufacture of the respective battery modules 12 and/or of the receiving structure 40 can be recognized. Such analyses can also have effects on processes, in particular subsequent processes, and thus can be recognized early.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for manufacturing a thermal interface in a battery for a motor vehicle, the method comprising:
    providing of at least one battery module and at least one receiving structure, with a receiving region comprising a heat-transmission surface for receiving a side of the battery module in an intended installation position;
    measuring the receiving region and/or the side of the battery module using a measuring device;
    determining, using a data processing device, a size and shape of a gap that forms between the heat-transmission surface and the side of the battery module in the intended installation position of the battery module based on the measuring;
    determining a dosage specification for a heat-conducting material for filling of the gap based on the determining of the size and shape of the gap using the data processing device;
    applying, using a dosing device, the heat-conducting material onto the heat-transmission surface and/or onto the side of the battery module based on the dosage specification; and
    installing the battery module, using an installation device, in the intended installation position by compressing of the heat-conducting material, whereafter the compressing the heat-conducting material forms the thermal interface between the side of the battery module and the heat-transmission surface.

2. The method according to claim 1, wherein during the measuring at least one of the following variables is detected:
    shape of the heat-transmission surface, wherein the shape of the heat-transmission surface comprises corrugations and/or protrusions;
    shape of the side of the battery module, wherein the shape of the side of the battery module comprises corrugations and/or protrusions;
    position of attachment points of the receiving region; and
    position of attachment points on the side of the battery module.

3. The method according to claim 1, wherein the measuring is effected using a 3D camera system, a laser-measuring device, and/or a measuring probe.

4. The method according to claim 1, wherein when determining the dosage specification, the heat-transmission surface and/or the side of the battery module is subdivided into individual segments, wherein respective individual volumes with respect to the heat-conducting material are established for the individual segments.

5. The method according to claim 1, wherein when determining the dosage specification, differences with respect to rigidities of the receiving structure and/or of the battery module are taken into account.

6. The method according to claim 1, further comprising applying the heat-conducting material in the form of a plurality of lines, wherein during the determining of the dosage specification a respective one of a plurality of cross-sections of the plurality of lines is adapted, depending on the size and shape of the gap.

7. The method according to claim 6, further comprising regulating of a rate of flow and/or dosing speed when applying the heat-conducting material, and the respective one of the plurality of cross-sections of the plurality of lines is adapted according to the dosing specification.

8. The method according to claim 6, wherein when determining the dosage specification, a number of lines of the plurality of lines is varied depending on the size and shape of the gap.

9. The method according to claim 1, further comprising measuring a plurality of battery modules and receiving structures, wherein depending on the measuring the plurality of battery modules an association of the battery modules to the receiving structures are effected according to at least one prescribed association criterion with respect to a smallest-possible dosage amount of the heat-conducting material for filling of the gap.

10. The method according to claim 1, further comprising verifying whether predetermined tolerances have been maintained in the receiving structure and/or in the battery module using data resulting from the measuring.

11. The method according to claim 1, wherein data resulting from the measuring are used to determine wear of tools and/or semi-finished products that are used for manufacturing the receiving structure and/or the battery module.

12. A system for manufacturing a thermal interface in a battery for a motor vehicle, comprising a measuring device, a data-processing device, a dosing device, and an installation device that are configured to carry out the method according to claim 1.

13. A computer program product that is configured to carry out, implement, and/or control the method according to claim 1.

14. A machine-readable storage medium on which the computer program product according to claim 13 is stored.

* * * * *